(12) United States Patent
Chen

(10) Patent No.: US 8,258,418 B2
(45) Date of Patent: Sep. 4, 2012

(54) KEYBOARD DOME OVERLAY STRUCTURE

(75) Inventor: Chao Chen, Waterloo (CA)

(73) Assignee: Research In Motion Limited, Waterloo (CA)

( * ) Notice: Subject to any disclaimer, the term of this patent is extended or adjusted under 35 U.S.C. 154(b) by 262 days.

(21) Appl. No.: 12/696,563

(22) Filed: Jan. 29, 2010

(65) Prior Publication Data

US 2011/0186413 A1    Aug. 4, 2011

(51) Int. Cl.
*H01H 9/04* (2006.01)
(52) U.S. Cl. .................................. 200/302.1; 200/516
(58) Field of Classification Search ............... 200/5 A, 200/406, 516, 302.1; 428/41.9
See application file for complete search history.

(56) References Cited

U.S. PATENT DOCUMENTS

| | | | |
|---|---|---|---|
| 4,263,485 A | 4/1981 | Corwin | |
| 6,603,086 B2 | 8/2003 | Kawaguchi | |
| 2006/0024110 A1* | 2/2006 | Dombrowski et al. | 400/490 |
| 2006/0125174 A1 | 6/2006 | Sera et al. | |
| 2006/0180455 A1 | 8/2006 | Sano | |
| 2008/0197002 A1* | 8/2008 | Jeffery et al. | 200/310 |
| 2009/0242374 A1 | 10/2009 | Ohsumi | |

FOREIGN PATENT DOCUMENTS

JP    2009146815    7/2009

OTHER PUBLICATIONS

Extended European Search report dated Jun. 14, 2010. In corresponding application No. 10152186.2.
English Abstract JP2009146815, published Jul. 2, 2009.

* cited by examiner

*Primary Examiner* — Vanessa Girardi
(74) *Attorney, Agent, or Firm* — Fitch, Even, Tabin & Flannery, LLP

(57) ABSTRACT

A dome overlay structure for a mobile device keyboard includes a plurality of dome switches, a circuit board disposed beneath the plurality of dome switches with each dome switch electrically coupled to the circuit board, a main overlay disposed over the plurality of dome switches, and a first adhesive dab centrally interposed between the dome switch and the main overlay with a second adhesive dab surrounding the first adhesive dab. Each dome switch has a central portion and a non-central portion. The first adhesive dab can bond the central portion of the dome switch to the main overlay. The second adhesive dab is configured to form a gap between the second adhesive dab and the non-central portion of the dome switch in an unactuated configuration and configured to contact the non-central portion of the dome switch in an actuated configuration.

23 Claims, 7 Drawing Sheets

KEYBOARD DOME OVERLAY STRUCTURE

FIELD OF TECHNOLOGY

The present disclosure relates generally to mobile devices. More specifically, the present disclosure relates to keyboard dome overlays for mobile devices.

BACKGROUND

With the advent of more robust electronic systems, advancements of electronic devices are becoming more prevalent. Electronic devices can provide a variety of functions including, for example, telephonic, audio/video, and gaming functions. Handheld electronic devices can include mobile stations such as cellular telephones, smart telephones, portable gaming systems, personal computers, portable MP3 players, electronic writing or typing tablets, handheld messaging devices, and portable computers.

Some electronic devices include switch panels such as keyboards and keypads. As the available functions of electronic devices continue to increase, the functionality of the switch panels also needs to increase. Because electronic devices often have limited space for switch panels such as keyboard and keypads, the size, tactile feedback, audible feedback, and life of the switch panel can be compromised to fit the switch panel on the electronic device. In smaller electronic devices, some switch panels require a very light force and very small deflection to actuate the individual keys of the switch panel. Without any type of feedback, operators can have difficulty sensing the switch closures, and thus can have difficulty in entering input using the switch panel. To address this, some switch panels have included dome switches that provide tactile feedback and audible feedback when the keys of the switch panel are actuated.

Typical dome switch panels include a circuit board panel having conductive traces separated by a conductive gap, where the conductive traces are arranged in a keyboard or a keypad array. The conductive traces correspond to each of the keys of the keyboard or keypad array. A flexible dome is provided above each of the conductive traces. When a key of the switch panel is depressed, the flexible dome is compressed towards the circuit board panel and closes the conductive trace, thereby closing the switch to enter input to the electronic device. When pressure or force is removed from the key, the flexible dome returns to its original shape, provides a gap between the conductive traces, and opens the switch. The flexibility and deflection of the dome can provide tactile feedback and audible feedback to indicate a switch has been closed, which also indicates input has been entered to the electronic device. In some dome switch panels, adhesive layers and composite structures can be incorporated with the dome switches to hermetically seal the dome switches to prevent dust and moisture from dirtying the switch and circuit board. The additional layers and structures can increase the rigidity of the dome switches and the key, which can affect tactile and audible feedback provided to the user. The less feedback given to the user to indicate successful switch closure and input entry, the more difficulty and frustration the user can have in actuating the switch panel.

BRIEF DESCRIPTION OF THE DRAWINGS

Embodiments of the present application will now be described, by way of example only, with reference to the attached Figures, wherein.

DETAILED DESCRIPTION

Figure 1:
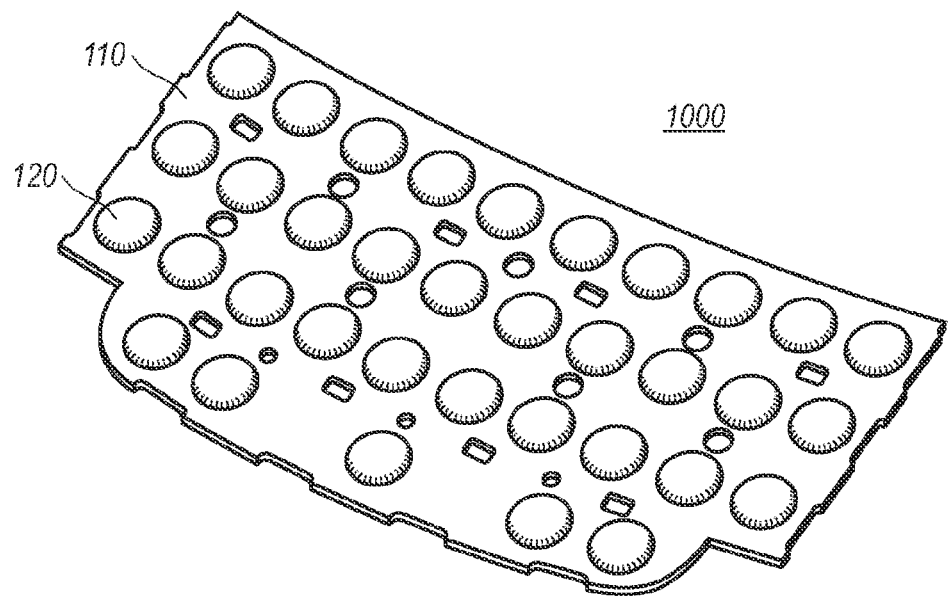
FIG. 1 is a front plan view of an exemplary keyboard dome overlay structure in accordance with an exemplary embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein.

The following figures describe a keyboard dome overlay structure for better tactile feel. While the following description describes a keyboard dome overlay structure for a handheld mobile communication device, one of ordinary skill in the art will appreciate that the keyboard dome overlay structure can be implemented with a standard computer keyboard, a portable computing device, a laptop, a personal digital assistant (PDA), a video game controller, a walkie-talkie, or any other electronic device that utilizes a switch panel, a keyboard, or a keypad.

A keyboard dome overlay structure comprises a plurality of dome switches, a circuit board disposed beneath the plurality of dome switches with each dome switch electrically coupled to the circuit board, a main overlay disposed over the plurality of dome switches, a first adhesive dab interposed between the dome switch and the main overlay, and a second adhesive dab applied to a surrounding region about the first adhesive dab. Each dome switch comprises a central portion and a non-central portion. The first adhesive dab can be interposed between the main overlay and the central portion of each of the plurality of dome switches. The second adhesive dab can be applied to a surrounding region about the first adhesive dab on the main overlay. In an unactuated configuration, a gap can be formed between the second adhesive dab and the non-central portion of the dome switch. Additionally, the second adhesive dab can be configured to contact the non-central portion of the dome switch in an actuated configuration. The assembly and configuration of the dome overlay, first adhesive dab, second adhesive dab, and dome switch allow for enhanced tactile feedback when the keyboard keycaps corresponding to the dome switches are actuated. Additional components, such as spacers and stiffeners can be included in the keyboard dome overlay structure to further enhance the tactile feedback of the associated keyboard. Other configurations and arrangements will be described below in relation to illustrated embodiments. One of ordinary skill would appreciate that the elements from the illustrated embodiments can be optionally included and arranged in various combinations to achieve the described benefits of the presently disclosed keyboard dome overlay structure.

Figure 2:
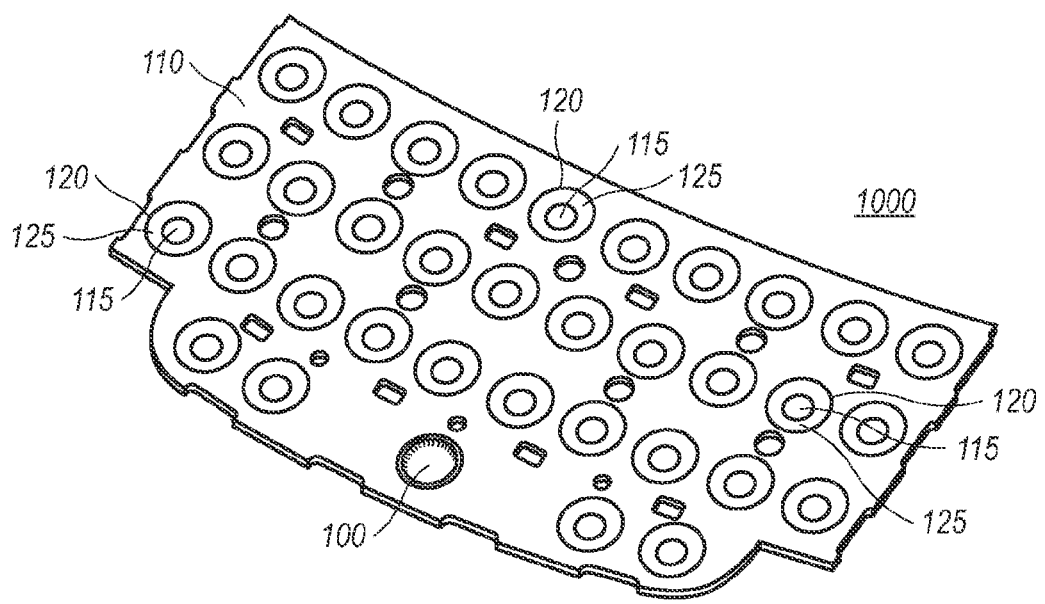
FIG. 2 is a rear plan view of the keyboard dome overlay structure illustrated in FIG. 1.

Referring to FIGS. 1 and 2, an exemplary embodiment of a keyboard dome overlay structure 1000 is illustrated in a top perspective view and a bottom perspective view. As illustrated, the keyboard dome overlay structure 1000 includes a main overlay 110, a plurality of dome switches 100, a first adhesive dab 115 centrally disposed between each dome switch 100 and the main overlay 110 and a second adhesive dab 125 applied to a surrounding region of the first adhesive dab 115. FIG. 1 is a top perspective view of an exemplary keyboard dome overlay structure 1000 in accordance with an exemplary embodiment. FIG. 2 is a bottom perspective view of the exemplary keyboard dome overlay structure 1000 illustrated in FIG. 1. The main overlay 110 can be made of a plastic membrane, a polyethylene terephthalate (PET) film, or any other flexible material. Additionally, the main overlay 110 can have an overlay thickness. In one embodiment, the main overlay 110 can have an overlay thickness of approximately 0.015 millimeters, 0.025 millimeters, 0.0225 millimeters, 0.030 millimeters, 0.050 millimeters, 0.100 millimeters or any other thickness that permits the main overlay 110 to fit in an electronic device.

In the embodiment illustrated in FIGS. 1 and 2, the main overlay 110 includes a plurality of dome-shaped overlays 120 disposed on top of the main overlay 110. Each dome-shaped overlay 120 can correspond to a keycap of a keyboard to which the keyboard dome overlay structure 1000 will be assembled. For example, the dome-shaped overlays 120 can correspond to the keycaps of a full text-entry keyboard, such as a QWERTY, QWERTZ, AZERTY, Dvorak, or any other standard text-entry keyboard. In the particular embodiment illustrated in FIGS. 1 and 2, there are thirty-five dome-shaped overlays 120. In other embodiments, where a reduced keyboard is implemented, the number of keycaps and corresponding dome-shaped overlays is reduced compared to that shown in the illustration. For example, only twenty dome-shaped overlays can be implemented. Still further, one of ordinary skill in the art will appreciate that the number of dome-shaped overlays 120 implemented in the keyboard dome overlay structure 1000 can be greater than or less than the thirty-five dome-shaped overlays 120 illustrated as desired for the particular configuration of the keys of the keyboard. In at least one alternative embodiment, the dome-shaped overlays 120 can correspond to any depressible key or button of the corresponding keyboard to be assembled with the keyboard dome overlay structure 1000. For example, the dome-shaped overlay 120 can correspond to a volume key, a menu key, a mute button, a function button, or any other depressible button or key of a keyboard.

In the above described embodiments, there is a dome-shaped overlay 120 for each dome switch 100. In the illustrated embodiment of FIGS. 1 and 2, the dome-shaped overlays 120 are integrally formed with the main overlay 110. In alternative embodiments (not shown), the main overlay 110 can have a plurality of cutouts corresponding to the dome-shaped overlays 120, and the dome-shaped overlays 120 can be disposed beneath the main overlay 110 so that the dome-shaped overlays 120 protrude through the corresponding cutouts of the main overlay 110. Additionally while the illustrated dome-shaped overlays 120 are formed as part of a single component, the disclosure contemplates the implementation of the dome-shaped overlays 120 in multiple components. For example two, three, four or more components can be implemented to provide the desired number of dome-shaped overlays. In at least one embodiment, dome-shaped overlays are provided individually.

In at least one embodiment, the dome-shaped overlay 120 can be formed by assembling a flat main overlay to a circuit board 105 (FIG. 3A) having a plurality of dome switches 100. As the circuit board 105 is pressed against the flat dome sheet, the dome switches 100 will push against the flat main overlay 110 to form the dome-shaped overlay 120. In this sense, the dome-shaped overlay 120 takes on a localized dome shape at each location associated with a dome switch 100 as the flat main overlay 110 is formed onto the dome switches 100. In this embodiment, a pre-load force is applied at the local dome-shaped overlay 120. This can provide a better tactile feel during actuation of the individual dome switches 100. In at least one alternative embodiment, the main overlay 110 can have the plurality of dome-shaped overlays 120 pre-formed into the main overlay 110. For example, the dome-shaped overlays 120 can be punched into the main overlay 110.

The dome switches 100 can be made of metal, plastic, rubber, a combination of such materials, or any other material that permits the dome switch to be depressed or compressed when pressure is applied to the top of the dome switch 100. Each dome switch 100 can correspond to a key of the keyboard associated with the keyboard dome overlay structure 1000. For example, each dome switch 100 can correspond to each key of a full text-entry keyboard, such as a QWERTZ keyboard, a QWERTY keyboard, an AZERTY keyboard, or any other full text-entry keyboard. Alternatively, in at least one embodiment, the dome switches 100 can correspond to each key of a reduced text-entry keyboard. In another embodiment, the dome switch 100 can correspond to any depressible key or button on the associated keyboard where tactile feedback is required. For example, the dome switch 100 can correspond to a function button, a mute button, a menu key, a volume button, or any other depressible key or button. Although the embodiment illustrated in FIGS. 1 and 2 shows a main overlay 110 comprising a plurality of dome-shaped overlays 120, one of ordinary skill in the art will appreciate that the main overlay 110 does not necessarily need to comprise dome-shaped overlays 120, as will be described later in this disclosure with respect to FIGS. 6 and 7.

Referring to FIG. 2, the first adhesive dab 115 and the second adhesive dab 125 are placed on the rear side of the main overlay 110. In the particular embodiment illustrated in FIG. 2, the first adhesive dab 115 is centrally disposed on each of the dome-shaped overlays 120 such that the first adhesive dab 115 is centrally interposed between the dome-shaped overlay 120 and the dome-switch 100. While FIG. 2 illustrates a first adhesive dab 115 that is circular in shape and that can be described as an adhesive dot, the present disclosure contemplates various shapes and configurations of the first adhesive dab 115. For example, the first adhesive dab 115 can also be described as an adhesive island, an adhesive pad, an adhesive patch, a square shaped adhesive patch, an ovular shaped adhesive patch, or any other type of adhesive dab. The shape can be triangular, circular, square, polygonal, or any other shape that forms a bonded region with the central portion of a dome switch 100, as described herein. The first adhesive dab 115 can have a first thickness of approximately 0.010 millimeters, 0.015 millimeters, 0.025 millimeters, 0.0275 millimeters, 0.0325 millimeters, 0.050 millimeters, 0.100 millimeters, 0.200 or any other thickness that permits the first adhesive dab 115, main overlay 110, and dome switch 100 to fit in an electronic device. In at least one embodiment, the first adhesive dab 115 can have a thickness that varies to correspond with the size of the dome switch 100. For example, the first adhesive dab 115 can have a thickness that varies between 0.015-0.200 millimeters to correspond with a dome switch that is approximately four (4) millimeters in diameter. As the diameter increases the thickness of the dab can also increase.

The second adhesive dab 125 is supplied to a surrounding region of the first adhesive dab 115 and can have a second thickness. In one embodiment, the second adhesive dab 125 can have a second thickness different from the first thickness of the first adhesive dab 115. For example, the second thickness can be less than the first thickness. The second adhesive dab 125 can also be made of an adhesive different from the first adhesive dab 115. In at least one embodiment, the first adhesive dab 115 can be made of a permanent adhesive of a screen printable adhesive, for example 3M 7533 or other adhesive having similar peel force, environmental resistance and dead load properties, and the second adhesive dab 125 can be made of a different adhesive. For example, the second adhesive dab 125 can be made of a low power removable adhesive. While the illustrated embodiment shows each dome shaped overlay 120 having an associated first adhesive dab 115 and second adhesive dab 125, one of ordinary skill in the art will appreciate that in at least one embodiment, the present disclosure contemplates the implementation with one dome shaped overlay 120 with a first adhesive dab 115 and a second adhesive dab 125. Additionally, in another embodiment, more than one but not each one of the dome shaped overlays 120 can have a first adhesive dab 115 and a second adhesive dab 125. Additionally, as described above, the number of keys of the keyboard can vary as well.

Figure 3A:
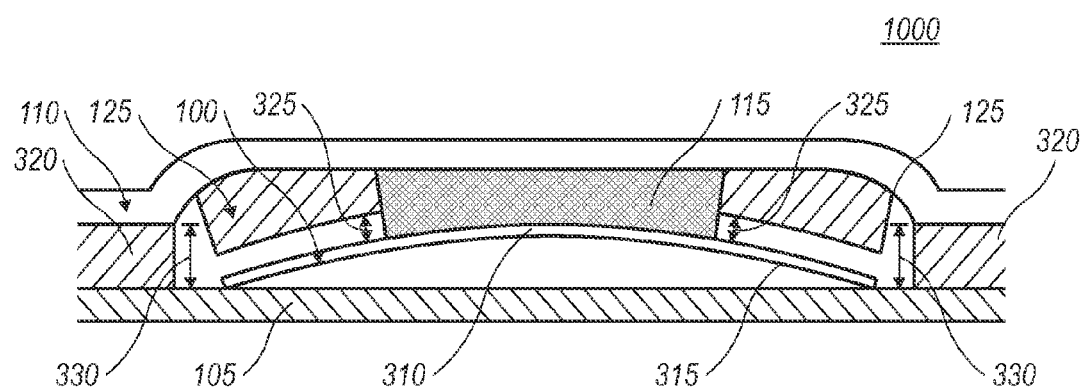
FIG. 3A is a cross-section view of one dome switch of an exemplary keyboard dome overlay structure coupled to circuit board in accordance with an exemplary embodiment and in an unactuated configuration.

FIG. 3A is a cross-section view of one dome switch 100 of the exemplary keyboard dome overlay structure 1000 coupled to the circuit board 105 in accordance with an exemplary embodiment and in an unactuated configuration. In the illustrated embodiment of FIG. 3A, the circuit board 105 is electrically coupled to the dome switch 100 beneath the dome switch 100. The circuit board 105 can be a printed circuit board (PCB), a printed circuit assembly (PCA), a flexible printed circuit (FPC), a wiring board, or any other circuit board to which the dome switches 100 can be electrically coupled. The dome switch 100 comprises a central portion 310 and a non-central portion 315. The illustrated dome switch 100 has a hemispherical shape, however one of ordinary skill in the art will appreciate that the dome switch 100 can be have a different shape. For example, the dome switch 100 can be a square, a frustum, a truncated cone, a cone, a truncated pyramid, or any other shape that can form a depressible central portion.

In FIG. 3A, the main overlay 110 is disposed over the dome switch 100, and the first adhesive dab 115 is centrally interposed between the main overlay 110 and the central portion 310 of the dome switch 100. The first adhesive dab 115 is bonded with the central portion 310 of the dome switch 100. The first adhesive dab 115 affixes the dome switch 100 with the main overlay 110 and holds the dome switch 100 in place in relation to the circuit board 105. In at least one example, the first adhesive dab 115 holds the dome switch 100 in place during assembly. Once the main overlay 110 is affixed to the circuit board 105, the dome switch 100 further interacts with the circuit board and is further held in place by the circuit board. In alternative embodiments, the first adhesive dab 115 can be bonded to an apex or peak point of the dome switch 100. In at least one embodiment, the configuration of the first adhesive dab 115 surrounded by the second adhesive dab 125 can act as a fulcrum when pressure is applied to the central portion 310 of the dome switch 100 to compress, depress, or actuate the dome switch 100.

Also illustrated in FIG. 3A is the second adhesive dab 125 applied to a surrounding region of the first adhesive dab 115. The second adhesive dab 125 is applied to the first adhesive dab 115 such that a gap 325 is formed between the second adhesive dab 125 and the non-central portion 315 of the corresponding dome switch 100 in an unactuated configuration. The second adhesive dab 125 is also configured to contact the non-central portion 315 of the dome switch 100 in an actuated configuration. As illustrated in FIG. 3A, the second adhesive dab 125 has a second thickness that is different from the first thickness of the first adhesive dab 115. In FIG. 3A, the second adhesive dab 125 has a second thickness that is less than the first thickness of the first adhesive dab 115. For example, in at least one embodiment, the first adhesive dab 115 can have a first thickness of 0.025 millimeters, and the second adhesive dab 125 can have a second thickness of 0.020 millimeters. In another embodiment, the first adhesive dab 115 can have a first thickness of 0.020 millimeters, and the second adhesive dab 125 can have a second thickness of 0.019 millimeters or less.

Figure 3B:
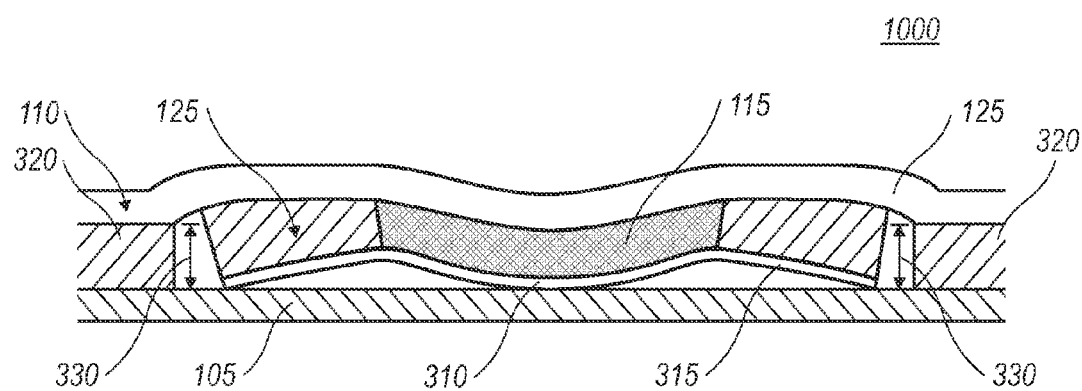
FIG. 3B is a cross-section view of the dome switch illustrated in FIG. 3A but in an actuated configuration.

In the assembled and unactuated configuration of FIG. 3A, the gap 325 is formed between the second adhesive dab 125 and the non-central portion 315 of the dome switch 100. The gap 325 can provide firm tactile feedback such that the tactile response is detected more than without the presence of the gaps once the non-central portion 315 of the dome switch 100 that is not bonded to the second adhesive dab 125 comes into contact with the second adhesive dab 125, as illustrated in FIG. 3B. The contact between non-central portion 315 of the dome switch 100 and the second adhesive dab 115 in the actuated configuration can be physically detected by the user. Thus the tactile difference between the unactuated configuration and the actuated configuration provides a firmed tactile feedback to a user as compared to a configuration without a gap. Additionally, as a result of the gap 325, the dome switch 100 can accommodate greater deflection when an associated key of the keyboard is compressed, depressed, or actuated prior to providing a tactile feedback. With the extra deflection in the dome switch 100, the user can experience enhanced tactile feedback, thereby indicating that the dome switch 100 has been successfully actuated to close the circuit of the circuit board 105 and to input data into the electronic device.

FIG. 3B is a cross-section view of one dome switch 100 of the exemplary keyboard dome overlay structure 1000 coupled to the circuit board 105 in accordance with an exemplary embodiment and in an actuated configuration. In the actuated configuration, the second adhesive dab 125 comes into contact with the non-central portion 315 of the dome switch 100. The second adhesive dab 125 can also enhance and provide additional tactile feedback when a key is actuated. The combination of the second adhesive dab 125 and the gap 325 formed between the second adhesive dab 125 and the non-central portion 315 of the dome switch 100 can enhance tactile feedback by reducing the pushing force required to actuate the dome switch 100 and by reducing the rigidity of the keyboard keys that can affect tactile feedback during keyboard operation. For example, as illustrated in FIG. 3B, the central portion 310 of the dome switch 100 and the first adhesive dab 115 has a greater deflection than the second adhesive dab 125 and the non-central portion 315 of the dome switch 100.

In the exemplary embodiment illustrated in FIGS. 3A and 3B, a spacer 320 can be disposed beneath the main overlay 110 and adjacent to the dome switch 100. The spacer 320 can be coupled to the main overlay 110 to accommodate and adjust for the height of the dome switch 100. For example, when dome switch 100 is coupled to the circuit board 105 and when the main overlay 110 is assembled over the dome switch, the height of the dome switch 100 provides a spacer distance 330 between the top of the circuit board 105 and the bottom of the main overlay 110. The spacer 320 is sized to compensate for this spacer distance 330 between the circuit board 105 and the main overlay 110. The spacer 320 can have a thickness similar to the thickness of the first adhesive dab 115 or can be thicker so long as the spacer 320 compensates for the spacer distance 330 between the main overlay 110 and the circuit board 105. In one embodiment, the spacer 320 can be an adhesive spacer, such as a layer of adhesive tape, a layer of adhesive glue, or any other type of adhesive spacer. In an alternative embodiment, the spacer 320 can be a layer of flexible material that is coupled to the main overlay 110 and the circuit board 105 by a double-sided adhesive layer. While the illustrated embodiment of FIGS. 3A and 3B shows a distance between an edge of the second adhesive dab 125 and the edge of the spacer 320, in at least one alternative embodiment, the second adhesive dab 125 can extend to the edge of the spacer 320 such that the edge of the second adhesive dab 125 abuts or comes into contact with the spacer.

Figure 4:
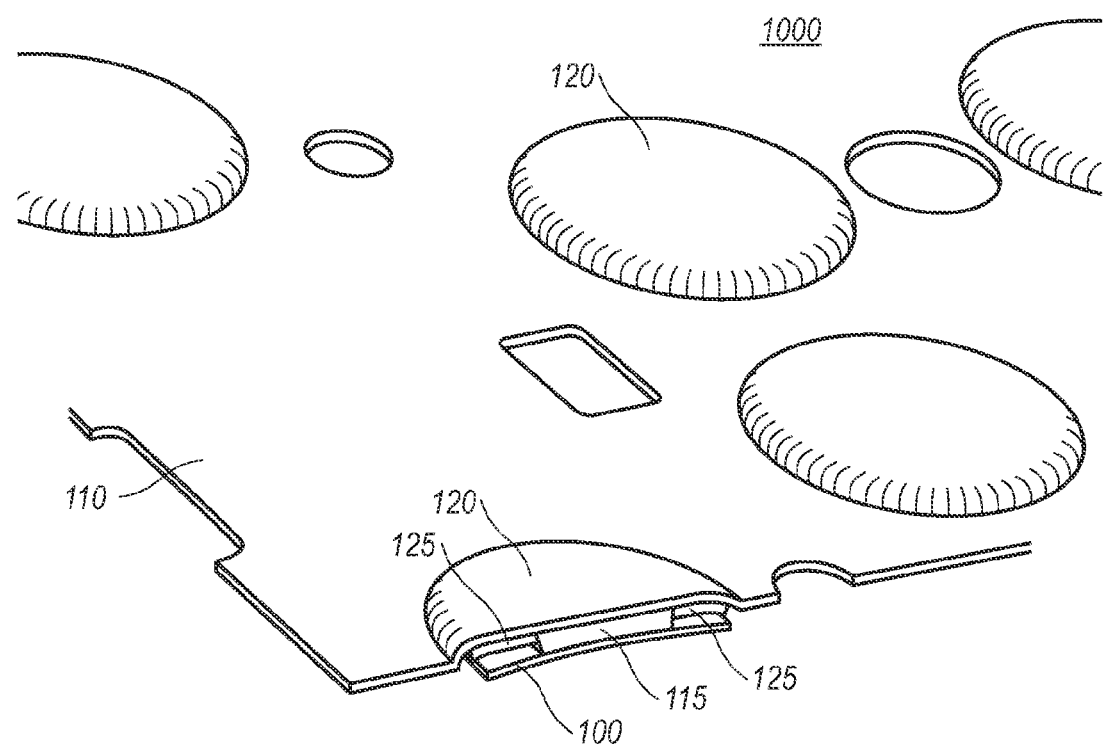
FIG. 4 is a perspective view of an exemplary keyboard dome overlay structure in accordance with an exemplary embodiment showing a cross-section view of one of the dome switches in an unactuated configuration.

FIG. 4 is a perspective cross-section view of an exemplary keyboard dome overlay structure in accordance with an exemplary embodiment in an unactuated configuration. Specifically, one dome overlay 120 of the main overlay 110 is shown in a perspective cross-section view. As illustrated the dome-shaped overlay 120 is circular in shape and the first adhesive dab 115 having the second adhesive dab 125 surrounding the first adhesive dab 115 is provided between the dome overlay 120 and the dome switch 100. While only a single structure is shown in cross-section, each of the dome-shaped overlays 120 has a corresponding first adhesive dab 115 affixed to the dome switch 100 located thereunder and a corresponding second adhesive dab 125 applied to a surrounding region about the first adhesive dab 115. In forming the main overlay 110 with its dome-shaped overlays 120, the first adhesive dabs 115 and the second adhesive dabs 125 can be formed thereon during a molding process or a printing process. Once the first adhesive dabs 115 and the second adhesive dabs 125 are applied the main overlay 110 can be bonded to the dome switches 100.

Figure 5:
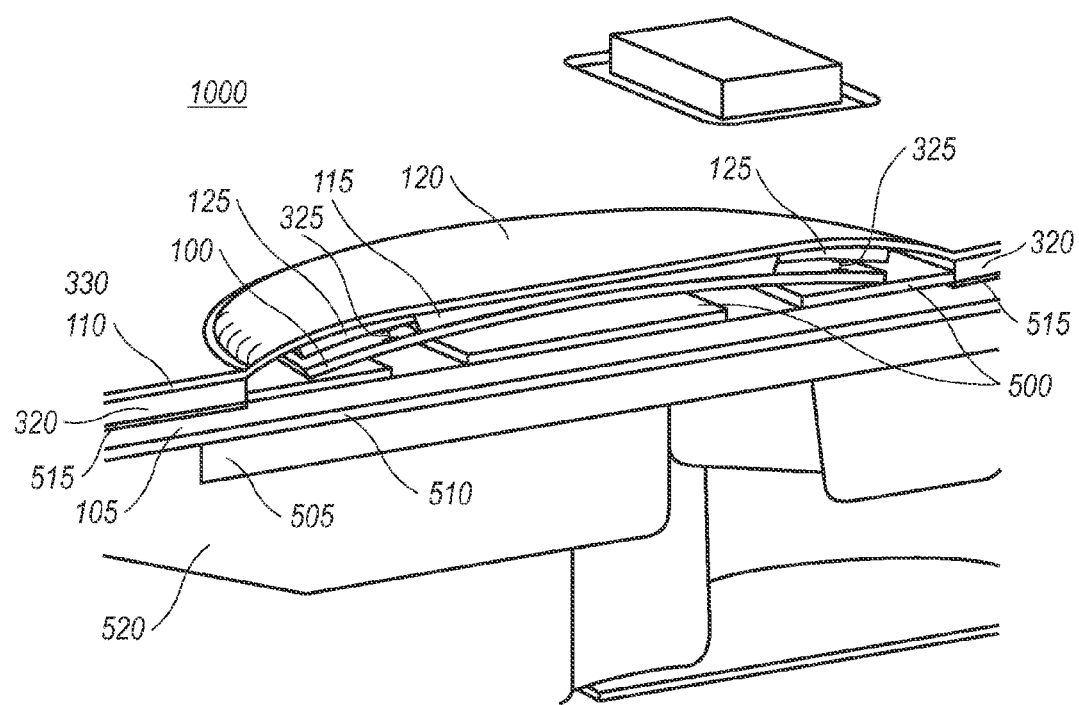
FIG. 5 is a perspective view of a dome switch of the exemplary keyboard dome overlay structure in accordance with an exemplary embodiment in an assembled and unactuated configuration.

FIG. 5 is a perspective cross-section view of one of the dome switches of the exemplary keyboard dome overlay structure in accordance with an exemplary embodiment in an assembled and unactuated configuration. Similar to the embodiments illustrated in FIGS. 1-4, FIG. 5 illustrates an embodiment of the exemplary keyboard dome overlay structure 1000 having the first adhesive dab 115 centrally interposed between the dome switch 100 and the dome-shaped overlay 120 of the main overlay 110. The second adhesive dab 125 is disposed at a surrounding region about the first adhesive dab 115. The first adhesive dab 115 is disposed on the dome switch 100 to contact the central portion 310 of the dome switch 100, and the second adhesive dab 125 is disposed about the first adhesive dab 115 to form a gap 325 between the second adhesive dab 125 and the non-central portion 315 of the dome switch 100 in an unactuated configuration.

The embodiment illustrated in FIG. 5 can comprise a support base 520 on which the keyboard dome overlay structure 1000 is disposed. The circuit board 105 can be coupled to the support base 520 by a layer of circuit board adhesive 510. The circuit board adhesive 510 can be a layer of double-sided tape, a layer of glue, or any other type of adhesive that secures the circuit board 105 to the support base 520 of the electronic device. In the illustrated embodiment, the keyboard dome overlay structure 1000 comprises a stiffener 505 disposed beneath the circuit board 105. The stiffener 505 provides a rigid surface on which the dome switch 100 can push against when the dome switch 100 is compressed or depressed. The stiffener 505 can enhance and provide additional tactile feedback to the user when the keys of the associated keyboard are actuated. One of ordinary skill in the art will appreciate however that the keyboard dome overlay structure 1000 need not include a stiffener 505.

As seen in FIG. 5, the spacer 320 can be provided between the circuit board 105 and the main overlay 110. The spacer 320 can be coupled to the circuit board 105 by a layer of spacer adhesive 515. The spacer adhesive 515 can be double sided tape, glue, or any other type of adhesive that secures the spacer 320 to the circuit board 105. In an alternative embodiment (not shown), the spacer 320 can be a spacer sheet having a plurality of cutouts corresponding to the plurality of dome switches 100. The spacer sheet 320 can be interposed between the main overlay 110 and the circuit board 105 to accommodate the spacer distance (not labeled) between the main overlay 110 and the circuit board 105 provided by the height of the dome switch 100 and the first adhesive dab 115.

Also shown in the FIG. 5 are plated pads 500, which can be disposed on a top surface of the circuit board 105 and can provide the circuitry that transmits input to the associated electronic device. The dome switches 100 can also be electrically coupled to the plated pads 500 to enter input to the associated electronic device. The plated pads 500 can be golden plated pads, but persons of ordinary skill in the art will appreciate that the plated pads 500 can also be copper plated pads or any other plated pad that facilitates transmittal of input to the electronic device when the dome switches 100 are actuated, depressed, or compressed.

Figure 6:
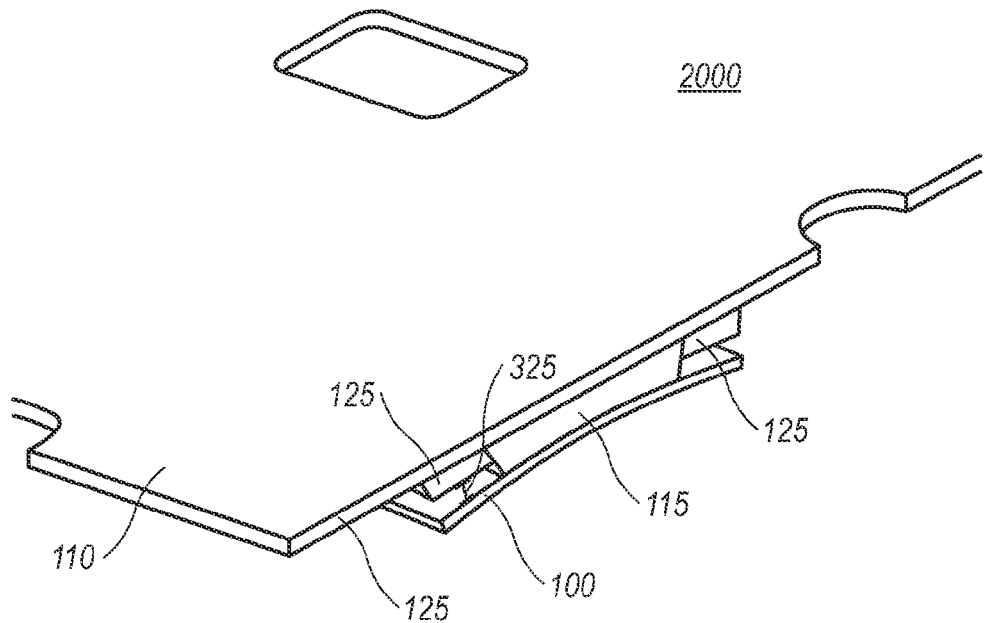
FIG. 6 is a top perspective view of an exemplary keyboard dome overlay structure in accordance with an alternative exemplary embodiment in an unactuated configuration.

FIG. 6 is a top perspective view of one of the dome switches 100 of an exemplary keyboard dome overlay structure 2000 in accordance with an alternative exemplary embodiment. While the previous figures have illustrated embodiments of a keyboard dome overlay structure 1000 having a main overlay 110 including a plurality of dome-shaped overlays, one of ordinary skill in the art will appreciate that in an alternative embodiment, the main overlay 110 need not include dome-shaped overlays (labeled as 120 in FIGS. 1-5). FIG. 6 illustrates such an embodiment where the main overlay 110 is flat. Such a flat main overlay 110 can be implemented into a membrane keyboard, a flat panel keyboard, a capacitive keyboard, or any other type of keyboard that does not require keycaps, individual buttons, or chiclet-type keycaps. In the illustrated embodiment, the first adhesive dab 115 is interposed between the main overlay 110 and the dome switch 105, and the second adhesive dab 125 is applied to the surrounding area about the first adhesive dab 115. As described in the embodiments illustrated in FIGS. 1-5, the first adhesive dab 115 is interposed between the dome switch 100 and the main overlay 110 such that the first adhesive dab 115 is in contact with the central portion of the dome switch 100. The second adhesive dab 125 is applied to a surrounding region about the first adhesive dab 115, whereby a gap (not labeled) is formed between the second adhesive dab 125 and the non-central portion of the dome switch 100 in an unactuated configuration. The second adhesive dab 125 is configured to contact the non-central portion of the dome switch 100 in an actuated configuration.

Figure 7:
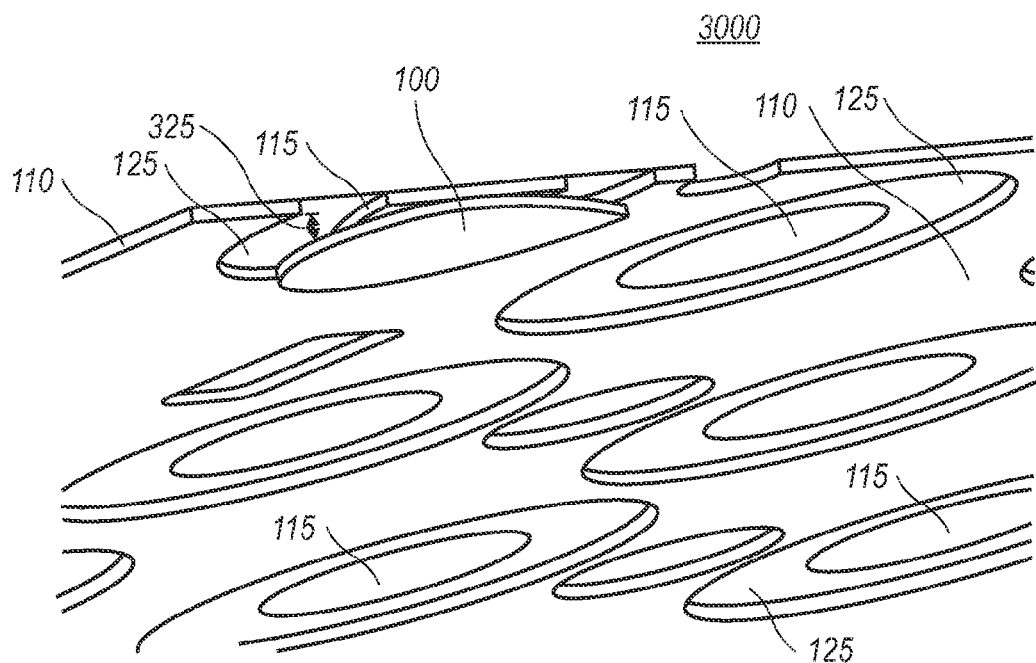
FIG. 7 is a bottom perspective view of the exemplary keyboard dome overlay structure illustrated in accordance with an exemplary alternative embodiment in an unactuated configuration.

FIG. 7 is a bottom perspective view of an exemplary keyboard dome overlay structure 3000 in accordance with yet another alternative embodiment. While only one dome switch 100 is shown assembled with the keyboard dome overlay structure, one of ordinary skill in the art will understand that each dome switch 100 will be coupled beneath each first adhesive dab 115 and each second adhesive dab 125. The embodiment illustrated in FIG. 7 is another example of a main overlay 110 that is flat. As described with respect to the embodiments illustrated in FIGS. 1-5, the first adhesive dab 115 is interposed between the dome switch 100 and the main overlay 110 such that the first adhesive dab 115 is in contact with the central portion of the dome switch 100. The second adhesive dab 125 is applied to a surrounding region about the first adhesive dab 115, whereby a gap (not labeled) is formed between the second adhesive dab 125 and the non-central portion of the dome switch 100 in an unactuated configuration. The second adhesive dab 125 is configured to contact the non-central portion of the dome switch 100 in an actuated configuration.

A method of constructing an electronic device having the keyboard dome overlay structure 1000 as described in any of the embodiments described herein can include: printing a first adhesive dab 115 on a rear surface of a main overlay 110 at a plurality of locations associated the plurality of dome switches 100 to be coupled to the main overlay 110. A second adhesive dab 125 can be printed on the rear surface of the main overlay 110 at the plurality of locations associated with the plurality of dome switches 100, wherein the second adhesive dab 125 surrounds the first adhesive dab 115 and has a thickness less than the thickness of the first adhesive dab 115. The method can also include coupling a plurality of dome switches 100 to the rear surface of the main overlay 110 so as to align the first adhesive dab 115 with the central portion 310 of each dome switch 100. The method can also include electronically coupling the main overlay 110 and the plurality of dome switches 100 to a circuit board 105.

In one embodiment, printing a first adhesive dab 115 on the main overlay 110 can include adhering a first adhesive sheet to the rear surface of the main overlay 110. Portions of the first adhesive sheet can be removed from the main overlay 110 such that the first adhesive dabs 115 remain at locations associated with dome switches 100 to be coupled to the main overlay 110. For example, the portions of the first adhesive sheet can be removed so that a circular first adhesive dab 115 or an adhesive island remains at each location associated with a dome switch 100. In this embodiment, the second adhesive dab 125 can be printed around the first adhesive dab 115. Alternatively, a second adhesive sheet can be adhered to the rear surface of the main overlay 110 and the first adhesive sheet can be adhered to the second adhesive sheet. Portions of the first adhesive sheet can be removed from the second adhesive sheet such that the first adhesive dabs 115 remain at the locations associated with dome switches 100 to be coupled to the main overlay 110.

In an alternative embodiment, printing the first adhesive dab 115 on the main overlay 110 can comprise printing individual first adhesive dabs 115, such as adhesive dots, adhesive pads, circular adhesive dabs, adhesive islands, square adhesive patches, or ovular adhesive pads, on the rear surface of the main overlay 110 at each location associated with a dome switch 100 to be coupled to the main overlay 110. In this embodiment, the second adhesive dabs 125 can be printed in a surrounding region about the first adhesive dab 115 such that the thickness of the second adhesive dab 125 is less than the thickness of the first adhesive dab 115. Alternatively, a second adhesive sheet can be printed on the rear surface of the main overlay, and individual first adhesive dabs 115 can be printed on the second adhesive sheet at each location associated with a dome switch 100 to be coupled to the main overlay 110. In this embodiment, printing the first adhesive dab 115 on the second adhesive sheet results in a second adhesive dab 125 surrounding each of the individual first adhesive dabs 115, wherein the thickness of the first adhesive dab 115 is greater than the thickness of the second adhesive dab 125.

In another alternative embodiment, the method for constructing a keyboard dome overlay structure 1000 can include printing the second adhesive dab 125 first on the main overlay 110 and then printing the first adhesive dab 115 on top of the second adhesive dab 125 such that the first adhesive dabs 115 are at locations associated with a dome switch 100 to be coupled to the main overlay 110. The first adhesive dab 115 and the second adhesive dab 125 can be printed such that the thickness of the first dab 115 is greater than the thickness of the second dab 125. Alternatively, the second adhesive dab 125 can be printed on the main overlay 110 such that a region in the middle of the second adhesive dab 125 has no adhesive. The first adhesive dab 115 can then be printed or screen-silked over the second adhesive dab 125 to fill in the middle region of the second adhesive dab 125. Consequently, the first adhesive dab 115 will be disposed on the main overlay 110 at location associated with the dome switches to be coupled to the main overlay 110 and the second dab 125 will be surrounding the first adhesive dab 115. Additionally, the first adhesive dab 115 will be applied to the main overlay and over the middle region of the second adhesive dab 125 such that the first adhesive dab 115 has a thickness greater than the thickness of the second adhesive dab 125.

In another embodiment, coupling the plurality of dome switches 100 to the rear surface of the main overlay 110 can comprise forming a bonded region between the central portion 310 of the dome switch 100 and the first adhesive dab 115. The method can also include forming a gap 325 between the non-central portion 315 of the dome switch 100 and the second adhesive dab 125 in an unactuated configuration of the dome switch 100.

The method of constructing the keyboard dome overlay structure 1000 can include coupling additional layers to the circuit board 105 or to the main overlay 110. In one embodiment, the method can include coupling a spacer 320 to the rear surface of the main overlay 110 such that the spacer 320 is interposed between the main overlay 110 and the circuit board 105. The method can also include applying an adhesive layer between the spacer 320 and the main overlay 110. Additionally, the method can include applying an adhesive layer 515 between the spacer 320 and the circuit board 105. Such adhesive layers can ensure that the spacer 320 is securely affixed or coupled to the keyboard dome overlay structure 1000.

In an alternative embodiment, the method can include coupling a stiffener 505 beneath the circuit board 105 thereby enhancing the rigidity of the circuit board and the tactile feedback of the keyboard dome overlay structure 1000 when a dome switch 100 is depressed, compressed, or actuated. The method can include applying an adhesive layer 510 between the stiffener 505 and the circuit board 105. The adhesive layer can ensure that the stiffener 505 is securely affixed or coupled to the keyboard dome overlay structure 1000.

Figure 8:
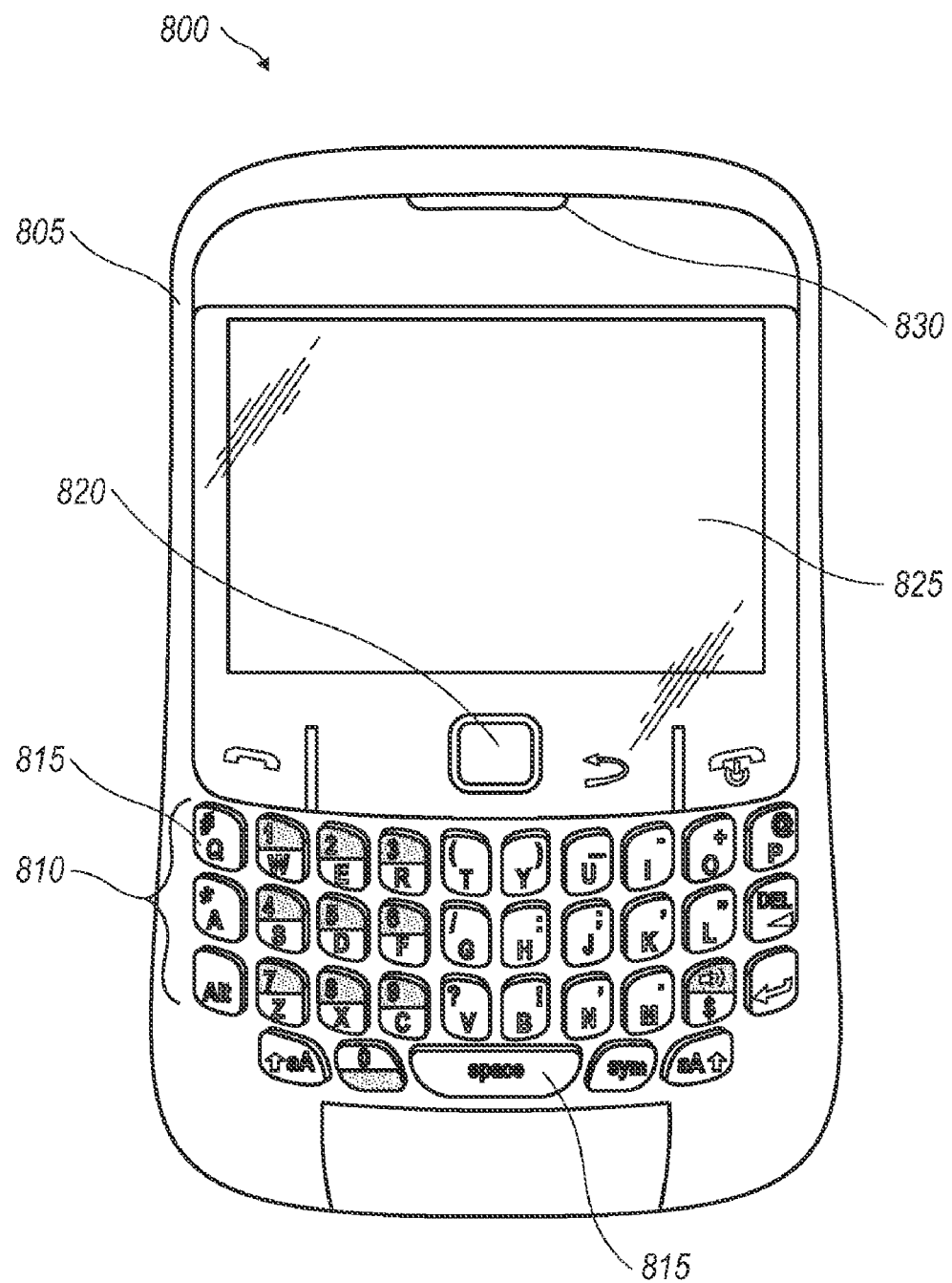
FIG. 8 is an elevational view of an exemplary electronic device having a keyboard dome overlay structure in accordance with an exemplary embodiment.

FIG. 8 is an elevational view of en exemplary electronic device having a keyboard dome overlay structure in accordance with an exemplary embodiment. The electronic device illustrated in FIG. 8 is a handheld telecommunication device 800. The handheld telecommunication device 800 includes a housing having a first face 805. A display screen 825 is disposed on the front face of the 805 of the housing, and more specifically is disposed between an audio port 830 and a navigation tool 820. A keyboard 810 comprising a plurality of keys 815 can be disposed below the navigation tool 820. The illustrated keyboard 810 is a full text-entry keyboard having keys 815 arranged in a traditional keyboard array, although a reduced keyboard layout is also possible. The keys 815 have at least one of numeric indicia, alphabetic indicia, and symbolic indicia. FIG. 8 shows the keys 815 of the keyboard 810 arranged in a QWERTY keyboard layout. However, one of ordinary skill in the art will appreciate that the keys 815 can be arranged in a QWERTZ keyboard layout, Dvorak keyboard layout, a Japanese keyboard layout, a Chinese keyboard layout, an AZERTY keyboard layout, or any other keyboard layout that facilitates text entry into an electronic device. Beneath the keyboard 810 is the keyboard dome overlay structure (not shown) described in the previous paragraphs. Each key 815 of the keyboard 810 is associated with a dome switch of the keyboard dome overlay structure. Because the keyboard dome overlay structure (not shown) includes the first adhesive dab 115 centrally interposed between the main overlay and each dome switch and the second adhesive dab 125 applied to the surrounding region about the first adhesive dab 115, the gap 325 is formed between the second adhesive dab 125 and the dome switch 100. The gap 325 enhances the tactile feel of the keyboard 810 when a user actuates the keys 815 of the keyboard 810. The keyboard dome overlay structure reduces the rigidity of a traditional dome switch and reduces the pushing force required to actuate the keys and close the dome switches which are necessary to enter input to the electronic device 800. Additionally, the keyboard dome overlay structure enhances and increases the deflection of the main overlay and the dome switch, thereby enhancing the tactile feedback to the user and informing the user that a dome switch has successfully closed, a key has been successfully actuated, or input has been entered to the electronic device 800. Thus, user frustration in actuating the keyboard 810 and entering input to the electronic device 800 can be reduced by implementing the present keyboard dome overlay structure in an electronic device. While the illustrated embodiment shows an electronic device 800 that is a handheld communication device, the electronic device can also be a PDA, a walkie-talkie, a GPS device, a handheld electronic translator, a netbook, a notebook computer, a laptop, a GPS device, a messaging device, a handheld gaming device, or any other electronic device that includes a keyboard, keypad, or switch panel.

Figure 9:
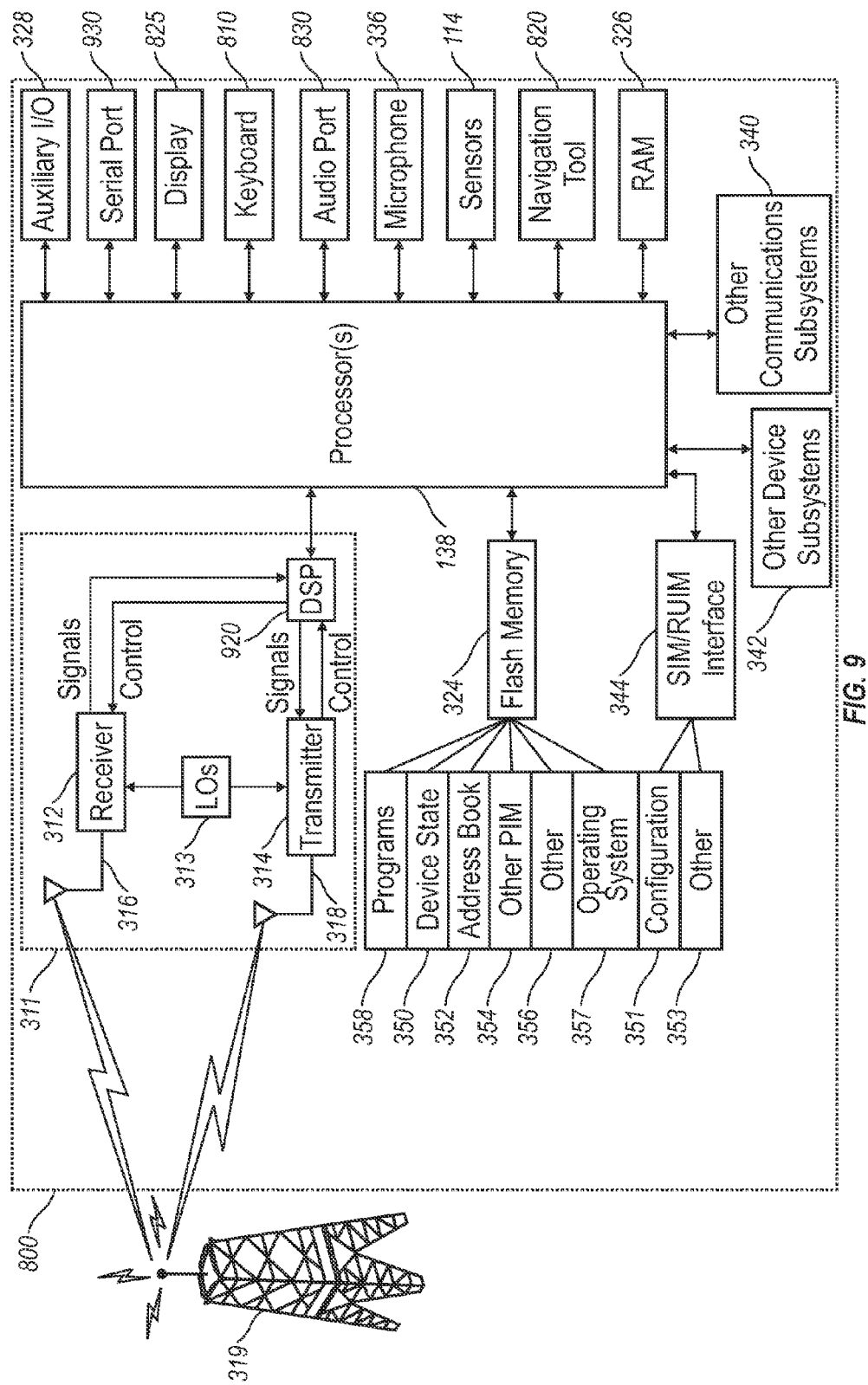
FIG. 9 is a block diagram illustrating the communication between an electronic device and a processor coupled with a keyboard dome overlay structure in accordance with an exemplary embodiment.

FIG. 9 is a block diagram of the electronic device 800 depicted in at least FIG. 8 that includes a keyboard dome overlay structure in accordance with any of the embodiments described herein. A communication subsystem 311 performs all communication transmission and reception with the wireless network 319. The processor module 138 further can be connected with an auxiliary input/output (I/O) subsystem 328 which can be connected to the communication device 800. In at least one embodiment, the processor module 138 can be connected to a serial port (for example, a Universal Serial Bus port) 930 which can allow for communication with other devices or systems. The display 825 can be connected to the processor module 138 to allow for displaying of information to an operator of the communication device 100. When the communication device 800 is equipped with the keyboard 810, the keyboard 810 can also be connected with the processor module 138. The keyboard 810 can be coupled to a keyboard dome overlay structure 1000 as described herein. In the presently described embodiment, a keyboard controller is in communication with the processor in order to send or relay messages corresponding to key pressings of the keyboard 810 to the processor 138. The dome switches 100 and the circuit board 105 are in communication with the keyboard controller and the processor module 138 to send and relay messages corresponding to key pressings of the keyboard 810. The communication device 800 can include the audio port 830, a microphone 336, random access memory (RAM) 326, and flash memory 324, all of which can be connected to the processor module 138. Other similar components can be provided on the device 800 as well and optionally connected to the processor module 138. Other communication subsystems 340 and other communication device subsystems 342 are generally indicated as being functionally connected with the processor module 138 as well. An example of a communication subsystem 340 is that of a short range communication system such as BLUETOOTH® communication module or a WI-FI® communication module (a communication module in compliance with IEEE 802.11 set of protocols) and associated circuits and components. The processor module 138 is able to perform operating system functions and enables execution of programs on the communication device 100. In some embodiments not all of the above components can be included in the communication device 800.

The auxiliary I/O subsystem 328 can take the form of a trackpad navigation tool 820 as illustrated in the exemplary embodiment shown in FIG. 8, or a trackball, a thumbwheel, a navigation pad, a joystick, touch-sensitive interface, or other I/O interface. While the above examples have been provided in relation to the auxiliary I/O subsystem 328, other subsystems capable of providing input or receiving output from the communication device 800 are considered within the scope of this disclosure. Other keys can be placed along the side of the communication device 800 to function as escape keys, volume control keys, scrolling keys, power switches, or user programmable keys, and can likewise be programmed accordingly.

Furthermore, the communication device 800 is equipped with components to enable operation of various programs, as shown in FIG. 9. In an exemplary embodiment, the flash memory 324 is enabled to provide a storage location for the operating system 357, device programs 358, and data. The operating system 357 is generally configured to manage other programs 358 that are also stored in memory 324 and executable on the processor. The operating system 357 honors requests for services made by programs 358 through predefined program 358 interfaces. More specifically, the operating system 357 typically determines the order in which multiple programs 358 are executed on the processor and the execution time allotted for each program 358, manages the sharing of memory 324 among multiple programs 358, handles input and output to and from other device subsystems 342, and so on. In addition, operators can typically interact directly with the operating system 357 through a user interface which can include the keyboard 810 and display screen 825. While in an exemplary embodiment the operating system 357 is stored in flash memory 324, the operating system 357 in other embodiments is stored in read-only memory (ROM) or similar storage element (not shown). As those skilled in the art will appreciate, the operating system 357, device program 358 or parts thereof can be loaded in RAM 326 or other volatile memory.

In one exemplary embodiment, the flash memory 324 contains programs 358 for execution on the communication device 800 including an address book 352, a personal information manager (PIM) 354, and the device state 350. Furthermore, programs 358 and other information 356 including data can be segregated upon storage in the flash memory 324 of the communication device 800.

When the communication device 800 is enabled for two-way communication within the wireless communication network 319, it can send and receive messages from a mobile communication service. Examples of communication systems enabled for two-way communication include, but are not limited to, the General Packet Radio Service (GPRS) network, the Universal Mobile Telecommunication Service (UMTS) network, the Enhanced Data for Global Evolution (EDGE) network, the Code Division Multiple Access (CDMA) network, High-Speed Packet Access (HSPA) networks, Universal Mobile Telecommunication Service Time Division Duplexing (UMTS-TDD), Ultra Mobile Broadband (UMB) networks, Worldwide Interoperability for Microwave Access (WiMAX), and other networks that can be used for data and voice, or just data or voice. For the systems listed above, the communication device 800 can require a unique identifier to enable the communication device 800 to transmit and receive messages from the communication network 319. Other systems may not require such identifying information. GPRS, UMTS, and EDGE use a Subscriber Identity Module (SIM) in order to allow communication with the communication network 319. Likewise, most CDMA systems use a Removable User Identity Module (RUIM) in order to communicate with the CDMA network. The RUIM and SIM card can be used in multiple different communication devices 800. The communication device 800 can be able to operate some features without a SIM/RUIM card, but it will not be able to communicate with the network 319. A SIM/RUIM interface 344 located within the communication device 800 allows for removal or insertion of a SIM/RUIM card (not shown). The SIM/RUIM card features memory and holds key configurations 351, and other information 353 such as identification and subscriber related information. With a properly enabled communication device 800, two-way communication between the communication device 800 and communication network 319 is possible.

If the communication device 800 is enabled as described above or the communication network 319 does not require such enablement, the two-way communication enabled communication device 800 is able to both transmit and receive information from the communication network 319. The transfer of communication can be from the communication device 800 or to the communication device 800. In order to communicate with the communication network 319, the communication device 800 in the presently described exemplary embodiment is equipped with an integral or internal antenna 318 for transmitting messages to the communication network 319. Likewise the communication device 800 in the presently described exemplary embodiment is equipped with another antenna 316 for receiving communication from the communication network 319. These antennae (316, 318) in another exemplary embodiment are combined into a single antenna (not shown). As one skilled in the art would appreciate, the antenna or antennae (316, 318) in another embodiment are externally mounted on the communication device 800.

When equipped for two-way communication, the communication device 800 features a communication subsystem 311. As is understood in the art, this communication subsystem 311 is modified so that it can support the operational needs of the communication device 800. The subsystem 311 includes a transmitter 314 and receiver 312 including the associated antenna or antennae (316, 318) as described above, local oscillators (LOs) 313, and a processing module 920 which in the presently described exemplary embodiment is a digital signal processor (DSP) 920.

It is contemplated that communication by the communication device 800 with the wireless network 319 can be any type of communication that both the wireless network 319 and communication device 800 are enabled to transmit, receive and process. In general, these can be classified as voice and data. Voice communication generally refers to communication in which messages for audible sounds are transmitted by the communication device 800 through the communication network 319. Data generally refers to all other types of communication that the communication device 800 is capable of performing within the constraints of the wireless network 319.

Example device programs that can depend on such data include email, contacts and calendars. For each such program, synchronization with home-based versions of the programs can be desirable for either or both of their long term and short term utility. As an example, emails are often time sensitive, so substantially real time synchronization can be desired. Contacts, on the other hand, can be usually updated less frequently without inconvenience. Therefore, the utility of the communication device 800 is enhanced when connectable within a communication system, and when connectable on a wireless basis in the network 319 in which voice, text messaging, and other data transfer are accommodated.

Exemplary embodiments have been described hereinabove regarding the implementation of a keyboard dome overlay structure to enhance tactile feedback during operation of the keyboard of an electronic device. However, one of ordinary skill in the art will appreciate that the method can be implemented on other devices, such as computing devices, PDAs, cellphones, or other devices utilizing keyboard, keypads, or switch panels to input data to an electronic device. One of ordinary skill in the art will also appreciate that the method can be performed by devices other than a processor, such as a hardware component, a hardware driver, an API, or other similar devices and components. Various modifications to and departures from the disclosed embodiments will occur to those having skill in the art. The subject matter that is intended to be within the spirit of this disclosure is set forth in the following claims.

What is claimed is:

1. A dome overlay assembly for a keyboard configured to influence tactile response of the keyboard, the dome overlay comprising:

at least one dome switch comprising a central portion and a non-central portion, the at least one dome switch corresponding to at least one key of the keyboard;

a circuit board disposed beneath the at least one dome switch and being electrically coupled to the at least one dome switch, a main overlay disposed over the at least one dome switch;

a first adhesive dab having a first thickness interposed between the main overlay and the central portion of the at least one dome switch, wherein the adhesive dab bonds at least the center of the at least one dome switch to the main overlay; and a second adhesive dab having a second thickness applied to at least a portion of a surrounding region about the first adhesive dab on the main overlay to thereby at least surround more than half a perimeter defining the first adhesive dab, wherein the second thickness is less than the first thickness and whereby a gap is formed between the second adhesive dab and the non-central portion of the at least one dome switch in an unactuated configuration, and the second adhesive dab is configured to contact the non-central portion of the at least one dome switch in an actuated configuration thereby influencing the tactile response of the keyboard.

2. The dome overlay assembly of claim 1 wherein the first adhesive dab is made of an adhesive different from the second adhesive dab.

3. The dome overlay assembly of claim 1 wherein the at least one dome switch, the first adhesive dab and the second adhesive dab comprise a plurality of dome switches, a plurality of first adhesive dabs, and a plurality of second adhesive dabs, wherein each of the first adhesive dabs and each of the second adhesive dabs are associated with one of the plurality of dome switches.

4. The dome overlay assembly of claim 1, wherein the main overlay comprises a plurality of dome-shaped overlays, each dome-shaped overlay corresponding to individual ones of a plurality of dome switches, the plurality of dome switches comprising the at least one dome switch.

5. The dome overlay assembly of claim 1, wherein the main overlay is flat.

6. The dome overlay assembly of claim 1 further comprising a stiffener disposed beneath the circuit board.

7. The dome overlay assembly of claim 1 further comprising a spacer sheet comprising at least one cutout corresponding to the at least one dome switch, the spacer sheet interposed between the main overlay and the circuit board.

8. The dome overlay assembly of claim 1, wherein the main overlay has an overlay thickness between approximately 0.015-0.100 millimeters.

9. The dome overlay assembly of claim 1, wherein the main overlay is made of a flexible polyethylene terephthalate film.

10. The dome overlay assembly of claim 1, wherein the first adhesive dab has a first thickness of approximately 0.015-0.200 millimeters.

11. The dome overlay assembly of claim 1, wherein the at least one dome switch is made of one of a metal, a plastic, and a rubber.

12. The dome overlay assembly of claim 1, wherein the at least one dome switch corresponds to at least one keycap of the keyboard, wherein the keyboard is arranged in one of a QWERTY, QWERTZ, and AZERTY layout.

13. The dome overlay assembly of claim 1, wherein the circuit board is one of a printed circuit board, a flexible printed circuit, printed circuit assembly, and a wiring board.

14. The dome overlay assembly of claim 1 wherein the second adhesive dab completely surrounds the first adhesive dab.

15. The dome overlay assembly of claim 1 wherein the second adhesive dab abuts the first adhesive dab.

16. The dome overlay assembly of claim 1 further comprising a spacer disposed beneath the main overlay and adjacent to the at least one dome switch.

17. The dome overlay assembly of claim 16, further comprising a double-sided adhesive layer interposed between the spacer and the circuit board.

18. A handheld device comprising:

a housing;

a display disposed on a front face of the housing; and a keyboard disposed on the housing and comprising:

a plurality of dome switches, wherein each dome switch comprises a central portion and a non-central portion, each dome switch corresponding to a key of the keyboard;

a circuit board disposed beneath the plurality of dome switches with each dome switch electrically coupled to the circuit board;

a main overlay disposed over the plurality of dome switches;

a first adhesive dab interposed between the main overlay and the central portion of each of the plurality of dome switches, wherein the adhesive dab bonds at least the center of the dome switch to the main overlay; and a second adhesive dab configured to influence tactile response of the keyboard applied to a surrounding region about the first adhesive dab on the main overlay to thereby at least surround more than half a perimeter defining the first adhesive dab, whereby a gap is formed between the second adhesive dab and the non-central portion of the dome switch in an unactuated configuration, and the second adhesive dab is configured to contact the noncentral portion of the dome switch in an actuated configuration.

19. The handheld device of claim 18, wherein the main overlay comprises a plurality of dome-shaped overlays, each dome-shaped overlay corresponding to one of the plurality of dome switches.

20. The handheld device of claim 18 further comprising a stiffener disposed beneath the circuit board.

21. The handheld device of claim 18 further comprising a spacer disposed beneath the main overlay and adjacent to at least one of the plurality of dome switches.

22. The handheld device of claim 18 wherein the first adhesive dab has a first thickness, and the second adhesive dab has a second thickness that is different from the first thickness.

23. The handheld device of claim 22 wherein the second thickness is less than the first thickness.

* * * * *